United States Patent [19]

Kaman et al.

[11] Patent Number: 5,231,401
[45] Date of Patent: Jul. 27, 1993

[54] IMAGING LIDAR SYSTEM

[75] Inventors: Charles H. Kaman, Farmington, Conn.; Bobby L. Ulich, Tuscon, Ariz.; Robert Mayerjak, Torrington; George Schafer, Somers, both of Conn.

[73] Assignee: Kaman Aerospace Corporation, Colorado Springs, Colo.

[21] Appl. No.: 565,631

[22] Filed: Aug. 10, 1990

[51] Int. Cl.⁵ .................... G01C 3/08; H04N 7/00
[52] U.S. Cl. ........................... 342/55; 356/5; 250/332; 358/95
[58] Field of Search .............. 342/55; 356/5, 6; 250/332; 358/95, 209, 213.26, 83, 100, 99, 211, 113, 125, 110

[56] References Cited

U.S. PATENT DOCUMENTS

| | | | |
|---|---|---|---|
| 2,541,374 | 2/1951 | Morton | 313/399 |
| 2,558,492 | 6/1951 | Lely et al. | 378/70 |
| 2,996,946 | 8/1961 | Brendholdt | 356/5 |
| 3,257,507 | 6/1966 | Borberg et al. | 358/255 |
| 3,278,753 | 10/1966 | Pitts et al. | 250/564 |
| 3,305,633 | 2/1967 | Chernoch | 358/95 |
| 3,360,793 | 12/1967 | Collis | 356/5 |
| 3,380,358 | 4/1968 | Neumann | 354/145.1 |
| 3,426,207 | 2/1969 | Fried et al. | 359/191 |
| 3,446,555 | 5/1969 | Kahn | 356/5 |
| 3,446,556 | 5/1969 | Collis | 356/5 |
| 3,467,773 | 9/1969 | Heckman, Jr. | 358/95 |
| 3,499,110 | 3/1970 | Heckman, Jr. | 358/95 |
| 3,527,533 | 9/1970 | Hook et al. | 356/5 |
| 3,527,881 | 9/1970 | Blanchard | 358/95 |
| 3,555,178 | 1/1971 | Arnold | 358/95 |
| 3,558,220 | 1/1971 | Werner | 359/894 |
| 3,566,021 | 2/1971 | Jakes, Jr. | 358/90 |
| 3,604,803 | 9/1971 | Kahn | 356/5 |
| 3,649,124 | 3/1972 | Takaoka et al. | 356/5 |
| 3,669,540 | 6/1972 | Rattman et al. | 356/4 |
| 3,669,541 | 6/1972 | Duguay | 359/2 |
| 3,670,098 | 6/1972 | Korpel | 358/112 |
| 3,674,925 | 7/1972 | Heckman, Jr. | 358/83 |
| 3,682,553 | 8/1972 | Kapany et al. | 356/4 |
| 3,689,156 | 9/1972 | Kerpchar | 356/5 |
| 3,723,648 | 3/1973 | Cornsweet | 358/95 |
| 3,743,418 | 7/1973 | Heflinger | 356/5 |
| 3,761,180 | 9/1973 | Maxwell, Jr. et al. | 356/152 |
| 3,781,552 | 12/1973 | Kadrmas | 356/4 X |
| 3,782,824 | 1/1974 | Stoliar et al. | 356/342 |
| 3,801,181 | 4/1974 | Kitano et al. | 359/652 |
| 3,832,028 | 8/1974 | Kapron | 385/43 |
| 3,834,795 | 9/1974 | Erickson et al. | 359/196 |
| 3,886,303 | 5/1975 | Morris | 358/83 |
| 3,895,388 | 7/1975 | Townsend | 354/132 |
| 3,897,150 | 7/1975 | Bridges et al. | 356/4 |
| 3,899,250 | 8/1975 | Bamberg et al. | 356/5 |
| 3,902,803 | 9/1975 | Lego, Jr. | 356/5 |
| 3,934,082 | 1/1976 | Gordon | 358/95 |
| 3,947,119 | 3/1976 | Bamberg et al. | 356/5 |
| 4,030,831 | 6/1977 | Gowrinathan | 356/359 |
| 4,050,819 | 9/1977 | Lichtman | 356/51 |
| 4,129,780 | 12/1978 | Laughlin | 250/333 |
| 4,143,400 | 3/1979 | Heckman, Jr. et al. | 358/95 |
| 4,174,524 | 11/1979 | Moran | 358/95 |
| 4,193,088 | 3/1980 | Moran | 358/95 |
| 4,195,221 | 3/1980 | Moran | 359/191 |
| 4,195,311 | 3/1980 | Moran | 358/95 |
| 4,197,088 | 4/1980 | Meserol et al. | 436/528 |
| 4,199,253 | 4/1980 | Ross | 356/5 |

(List continued on next page.)

Primary Examiner—John B. Sotomayor
Attorney, Agent, or Firm—Fishman, Dionne & Cantor

[57] ABSTRACT

An airborne imaging lidar (light detection and ranging) sensor is provided which employs multiple pulsed laser transmitters, multiple gated and intensified array camera receivers, an optical scanner for increased field of regard, and a computer for system control, automatic target detection and display generation. The laser transmitters and multiple camera receivers are optically boresighted to the optical scanner (e.g., oscillating flat mirror) for an increased swath width perpendicular to the aircraft heading. The several laser transmitters are coupled for increased power and system sensitivity.

54 Claims, 12 Drawing Sheets

U.S. PATENT DOCUMENTS

| | | | |
|---|---|---|---|
| 4,226,529 | 10/1980 | French | 356/5 |
| 4,239,388 | 12/1980 | Green | 356/5 |
| 4,270,142 | 5/1981 | Mackelburg et al. | 358/99 |
| 4,277,167 | 7/1981 | Eppel | 356/5' |
| 4,298,280 | 11/1981 | Harney | 356/5 |
| 4,380,391 | 4/1983 | Buser et al. | 356/5 |
| 4,397,549 | 8/1983 | Morgan | 356/5 |
| 4,515,471 | 5/1985 | Eden | 356/5 |
| 4,515,472 | 5/1985 | Welch | 356/5 |
| 4,518,254 | 5/1985 | Penny et al. | 356/5 |
| 4,603,250 | 7/1986 | Contini et al. | 356/5 X |
| 4,634,272 | 1/1987 | Endo | 356/5 |
| 4,639,590 | 1/1987 | Butterwick | 250/214 VT |
| 4,646,140 | 2/1987 | Bailey et al. | 358/50 |
| 4,687,326 | 8/1987 | Corby, Jr. | 356/5 |
| 4,688,086 | 8/1987 | Hutchin | 358/95 |
| 4,707,698 | 11/1987 | Constant | 342/179 |
| 4,708,473 | 11/1987 | Metzdorff et al. | 356/5 |
| 4,717,252 | 1/1988 | Halldorsson et al. | 356/5 |
| 4,725,135 | 2/1988 | Browning | 353/122 |
| 4,727,259 | 2/1988 | Halvis | 250/561 |
| 4,754,151 | 6/1988 | Billard | 250/574 |
| 4,757,200 | 7/1988 | Shepherd | 250/332 |
| 4,796,090 | 1/1989 | Fraier | 358/211 |
| 4,926,050 | 5/1990 | Shemwell | 250/560 |
| 4,963,017 | 10/1990 | Schneiter et al. | 356/1 |
| 4,963,024 | 10/1990 | Ulich | 356/342 |
| 4,964,721 | 10/1990 | Ulich et al. | 356/5 |
| 4,967,270 | 10/1990 | Ulich et al. | 358/95 |
| 5,006,721 | 4/1991 | Cameron et al. | 250/561 |
| 5,013,917 | 5/1991 | Ulich | 250/330 |
| 5,029,009 | 7/1991 | Ulich et al. | 358/209 |
| 5,034,810 | 7/1991 | Keeler | 358/95 |
| 5,071,596 | 12/1991 | Goela et al. | 264/1.2 |
| 5,091,778 | 2/1992 | Keeler | 358/95 |
| 5,096,293 | 3/1992 | Cecchi et al. | 356/318 |
| 5,109,349 | 4/1992 | Ulich et al. | 364/525 |

IMAGING LIDAR SYSTEM

CROSS-REFERENCE TO RELATED APPLICATION

This application is related to U.S. application Ser. No. 07/565,807 filed contemporaneously herewith entitled "Radiation Projecting Device" invented by Robert Mayerjak and George Schafer.

BACKGROUND OF THE INVENTION

This invention relates generally to a sensor system for remote detection and imaging of objects in a backscattering medium such as air or water. More particularly, this invention relates to a method and apparatus for detecting, locating and/or imaging underwater objects such as mines and submarines from an airborne platform using a novel imaging lidar (light detection and ranging) system having a large area search rate capability and which is compatible with a computerized automatic targeting system.

It is desirable in a number of military and civilian applications to search a volume within a backscattering medium for the presence of certain targets. For instance, moored or bottom mines deployed in ocean shipping lanes are a hazard to navigating ships used both for military and for commercial Purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging. An improved and novel system for remote detection and imaging of objects underwater (or objects obscured by other backscattering media which is at least partially transmitting to light such as ice, snow, fog dust and smoke) from an airborne platform has been described in U.S. Pat. No. 4,862,257 and U.S. patent application Ser. No. 256,778 filed Oct. 12, 1988, now U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. application Ser. No. 256,778 relates to an imaging lidar system intended for night vision. Imaging lidar systems of the type described hereinabove are also disclosed in commonly assigned U.S. patent application Ser. No. 420,247 filed Oct. 12, 1989 (now U.S. Pat. No. 4,964,721), and U.S. patent application Ser. No. 364,860 filed Jun. 12, 1989 (now U.S. Pat. No. 4,967,270), both of which are incorporated herein by reference. U.S. Ser. No. 420,247 relates to an imaging lidar system which controls camera gating based on input from the aircraft onboard altimeter and uses a computer to thereby adjust total time delay so as to automatically track changing platform altitude. U.S. Ser. No. 364,860 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse. While the imaging lidar systems described above are well suited for their intended purposes, there continues to be a need for imaging lidar systems of this type which have improved operational accuracy and efficiency in the imaging of targets enveloped by a backscattering medium. It is also highly desirable to have an imaging lidar system which can display pictures of targets of interest to a human operator for classification and threat assessment. Finally, it is also desirable for the imaging sensor to have a large aerial search rate capability that one or a small number of sensors may be effectively used to detect submerged targets.

SUMMARY OF THE INVENTION

The above-discussed and other problems and deficiencies of the prior art are overcome or alleviated by the imaging sensor of the present invention. In accordance with the present invention, an airborne imaging lidar (light detection and ranging) sensor is provided which employs multiple pulsed laser transmitters, multiple gated and intensified array camera receivers, an optical scanner for increased field of regard, and a computer for system control, automatic target detection and display generation.

The present invention provides a means for rapidly searching a large volume of the backscattering medium (e.g., water) for specified targets and improves upon the current state of the art in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability. The gating of multiple cameras is adaptively controlled by the computer using a set of specified rules determined by modeling the system performance in various configurations. That is, the computer determines how to arrange the range gates and how many cameras are allocated to each range gate depending on the maximum and minimum depths to be searched and on the optical properties of the backscattering medium (such as the diffuse attenuation coefficient and the 180 degree backscatter coefficient).

In accordance with an important feature of this invention, each of the multiple cameras is accurately aligned to the common boresight direction along with each of the lasers. Each camera has a rectangular (or square) field of view, and the laser projection optics produce an identical laser beam coverage to the camera instantaneous field of view (IFOV). In a first embodiment, a single flat scanning mirror is oscillated in the roll axis of the moving aircraft sensor platform in order to scan the relatively narrow IFOV over a much larger field of regard, producing a very large swath width perpendicular to the aircraft projected track. The roll scanning mirror is stepped between each laser pulse so that slightly overlapping pictures are obtained from the target area being searched to avoid gaps in the area coverage and potentially missed targets. In a second embodiment, each camera and laser is associated with a discrete mirror, with the several discrete mirrors being interconnected for synchronized motion.

Still other important features of this invention are multiple modes of operation, a computer-generated scrolling display with overlaid alphanumerical symbology and variable magnification of target subimages, and digital data recording and encrypted transmission of target data for full fidelity remote processing.

The above described features and advantages of the present invention represent innovations which result in improved performance compared to the earlier lidar systems described with regard to the above-referenced patents and applications. In addition, these features and advantages will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
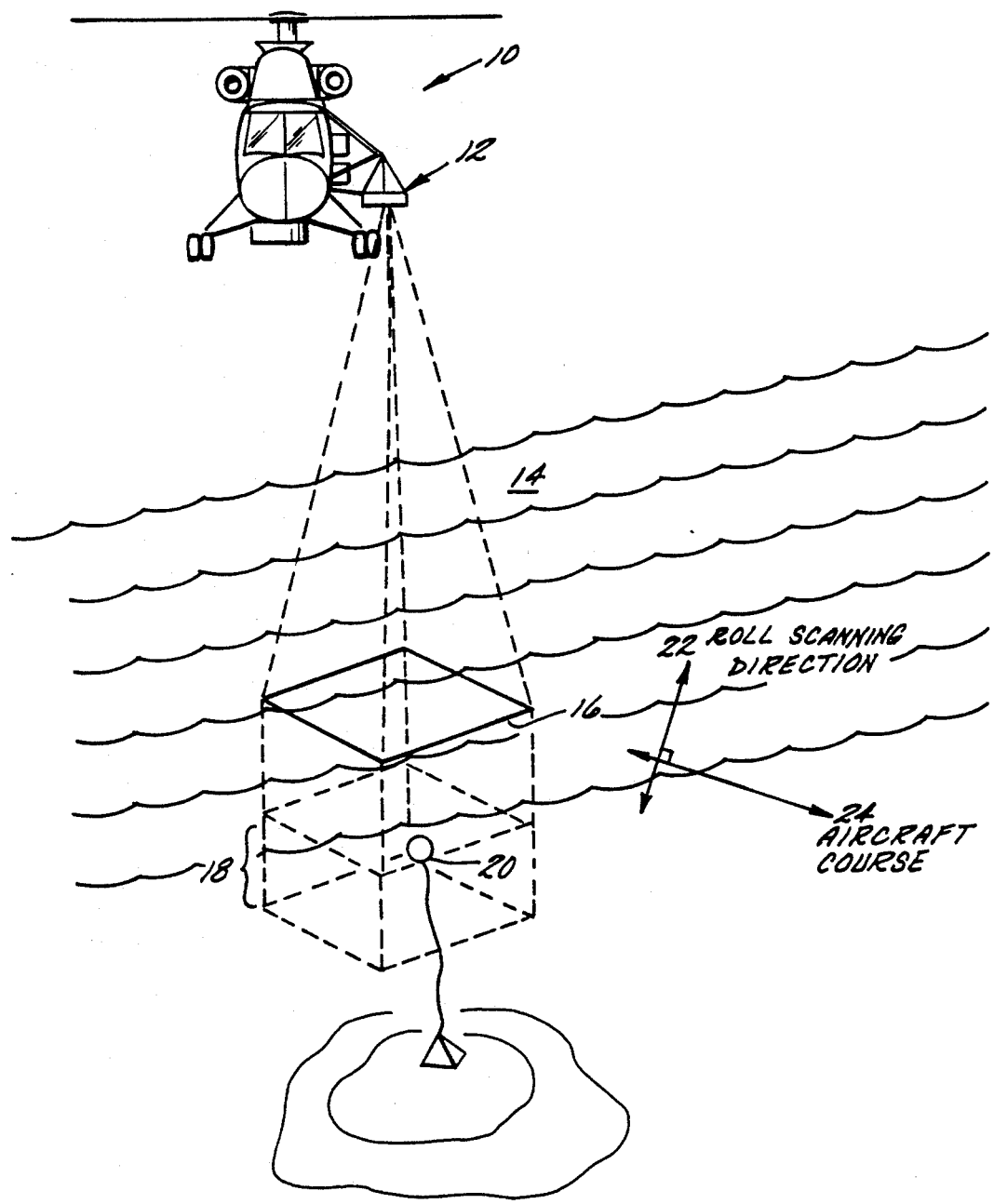
FIG. 1 is a perspective view of an airborne platform (e.g., helicopter) employing an imaging lidar system in accordance with the present invention.

The basic principle of operation of the imaging sensor of the present invention is shown in FIG. 1. An airborne platform such as a helicopter 10 (or fixed wing aircraft) has sensor equipment 12 of the present invention mounted so that the ocean 14 (or other body of water) below is visible from sensor 12 without obstruction. Of course, it will be appreciated that sensor 12 described herein is not limited to detecting targets submerged in the ocean, but will function effectively in any backscattering medium (such as air or optically transmissive materials). The sensor instantaneous field of view (IFOV) is a rectangle 16 on the surface of the water. In accordance with well known operative procedures for lidar systems (described in detail in U.S. Pat. No. 4,862,257), the gating of the cameras will be delayed beyond the time the surface glint returns to sensor 12 in order to avoid undesirable clutter in images of submerged targets. The camera gating is actually delayed so that a submerged water volume 18 is imaged which may contain a target 20 such as a moored mine. The sensor IFOV may be scanned in the roll plane 22 which is perpendicular to the aircraft course 24. This side-to-side scanning is used to increase the lateral range of search and detection. Thus, the sensor has a large field of regard or swath width as the aircraft flies along its course.

Figure 2:
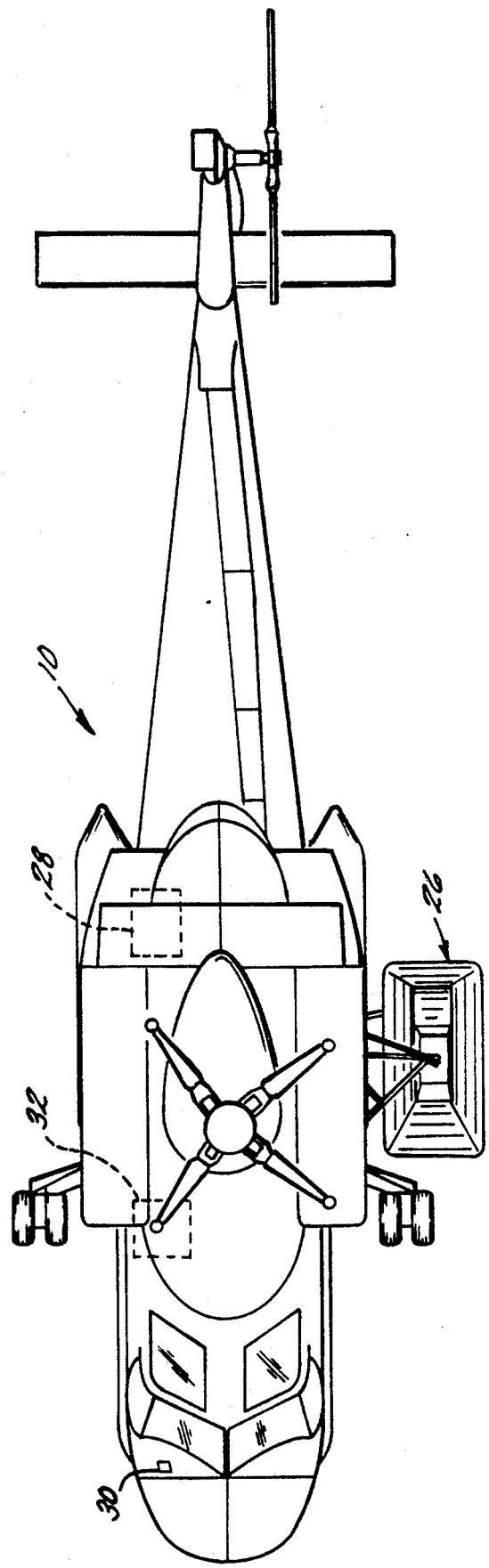
FIG. 2 is a top plan view of the helicopter of FIG. 1.

A preferred arrangement of sensor equipment 12 in a helicopter 10 (or other airborne platform) is shown in FIG. 2. In general, the sensor hardware comprises four units (Pod 26, rack 28, arming switch 30 and display unit 32) which are mounted on and within helicopter 10. An externally mounted pod 26 which is mounted utilizing vibration isolation means contains the lasers, cameras and scanner mechanisms. An internally-mounted equipment rack 28 contains power supplies, control electronics and computers. A cockpit-mounted laser master arm switch 30 allows the pilot to enable or disable laser operation which may pose an eye safety hazard at low operating altitudes because of the large energy radiated in each laser pulse. Finally, an operator's control and display unit 32 is located within the crew cabin allowing a human operator to turn the system on, make adjustments and view the computer-generated display screen.

Because of the high-vibration levels typically encountered in the aircraft, a preferred embodiment of this invention isolates sensitive equipment to assure proper operation. In accordance with the present invention, this is accomplished in three ways. First, the equipment mounting hardware contains vibration isolation mechanisms (usually spring-dampers). Secondly, individual subassemblies of the sensor of this invention are mounted on isolators within the pod 26 or equipment racks 28. Third, the component mounting hardware is specially designed to be rugged and resistant to mechanical misalignment due to continued exposure to vibration.

Figure 3:
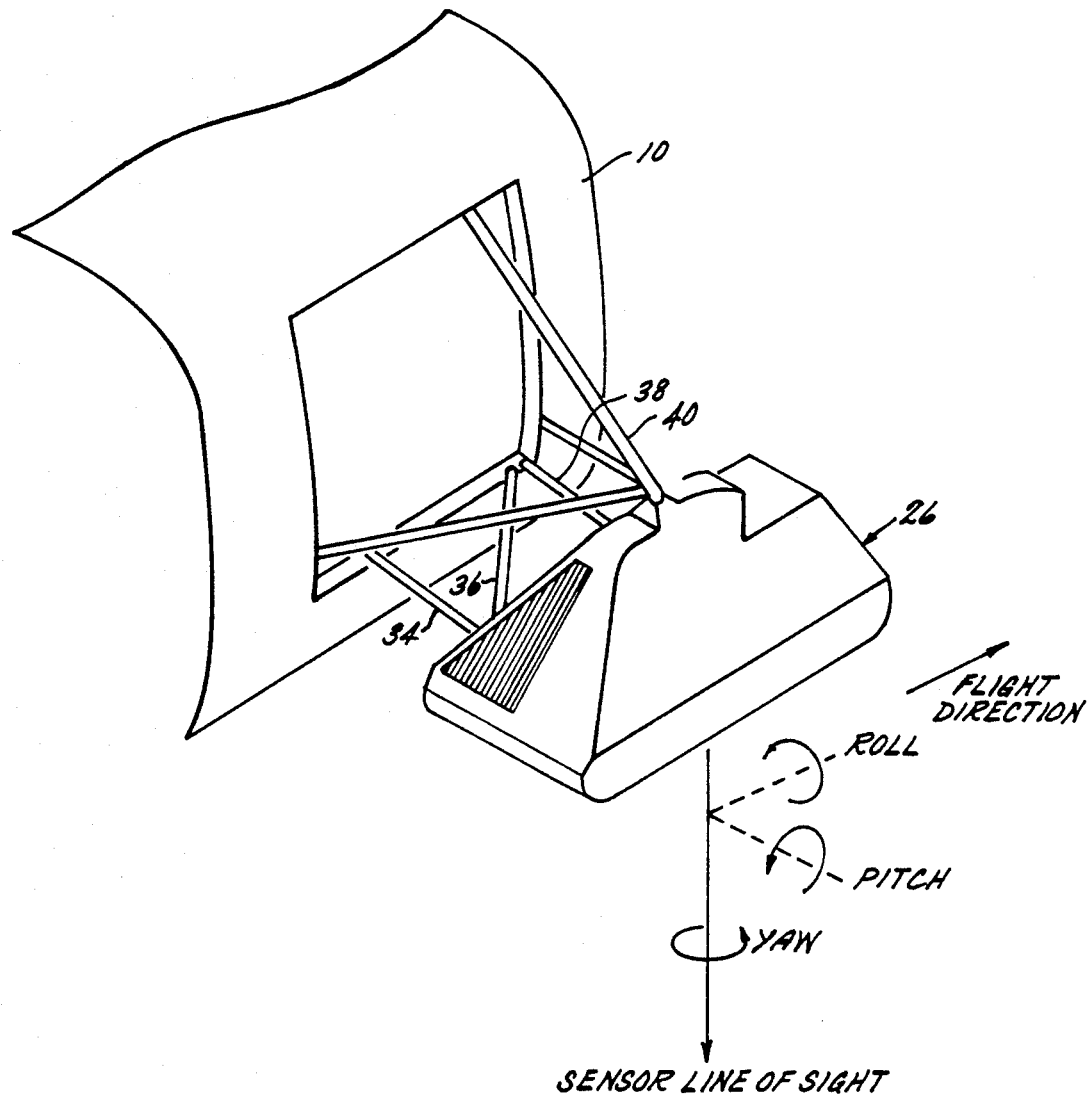
FIG. 3 is an enlarged perspective view of a portion of the imaging lidar system of FIG. 1.

In still another preferred embodiment of this invention, the pod is stabilized as shown diagrammatically in FIG. 3. That is, pitch, roll, and yaw variations in the aircraft attitude can be compensated so that the line of sight of the sensor optics inside pod 26 and the orientation of the camera output images are held to their desired values despite angular attitude variations in the aircraft. This is accomplished by means of computer monitoring of aircraft attitude signals (pitch, roll and heading) Deviations from the desired pitch, roll and course of the sensor data are then compensated by the computer adjusting the lengths of three linear actuators (34, 36 and 38) which connect pod 26 to aircraft 10. Pod 26 can be suspended from a gimbaled point supported by a tripod structure 40 as shown in FIG. 3. In prior lidar systems of the type described herein, the pod was rigidly attached to the airborne platform. The use of a movable pod attachment in accordance with the present invention is an important improvement over prior rigid attachments as it permits changes in orientation of the lidar system independently of the orientation and course heading of the airborne platform. This permits the lidar system to further expand its viewing path beyond the restraints of the airborne platform.

Figure 4:
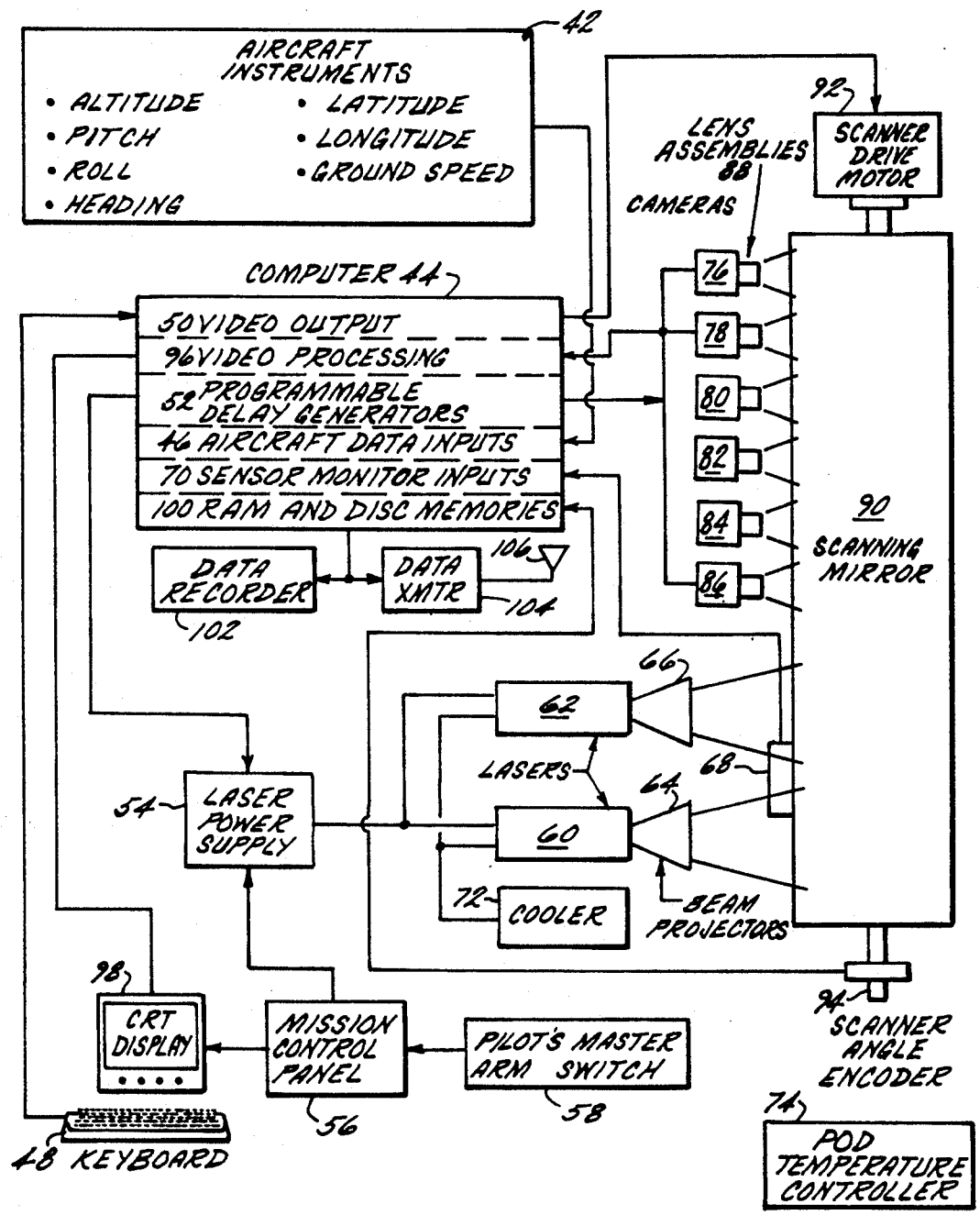
FIG. 4 is a schematic diagram of the imaging lidar system in accordance with the present invention.
Figure 5:
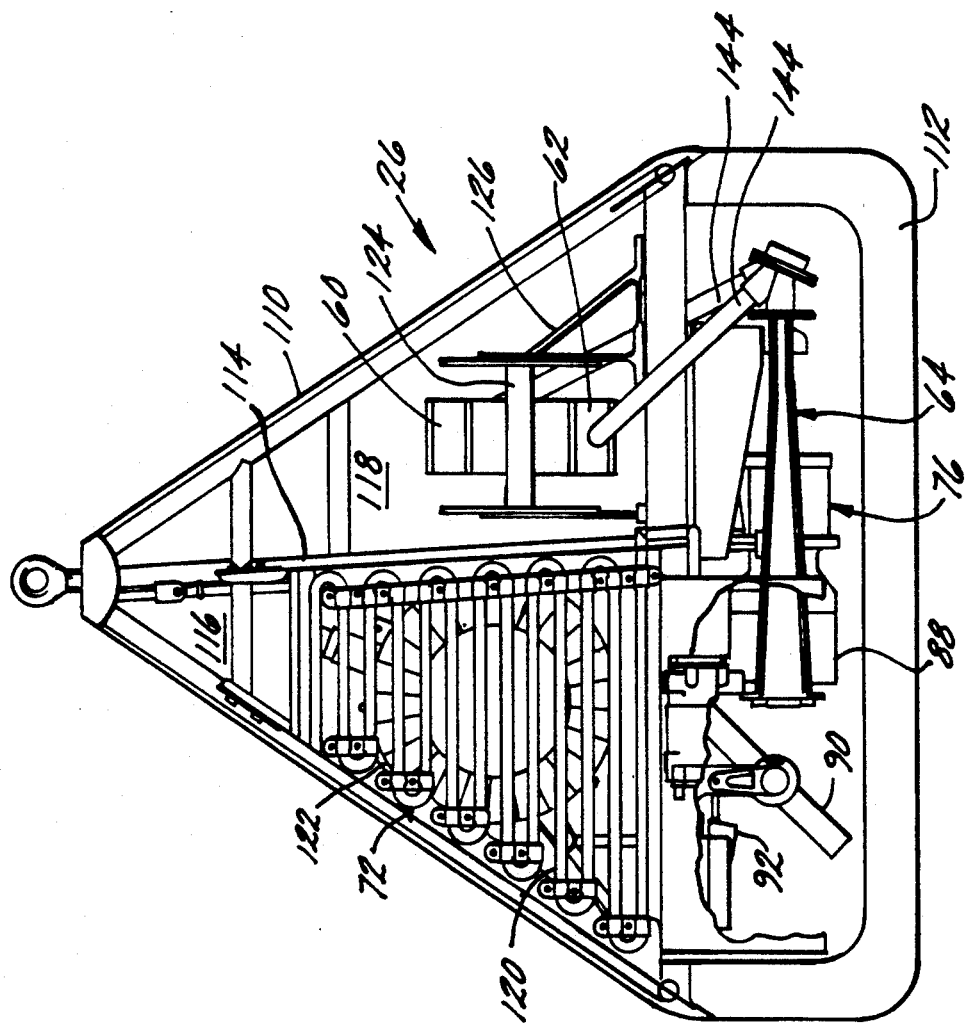
FIG. 5 is a front elevation view of the pod enclosure for a first embodiment of the imaging lidar system of FIG. 4.
Figure 6:
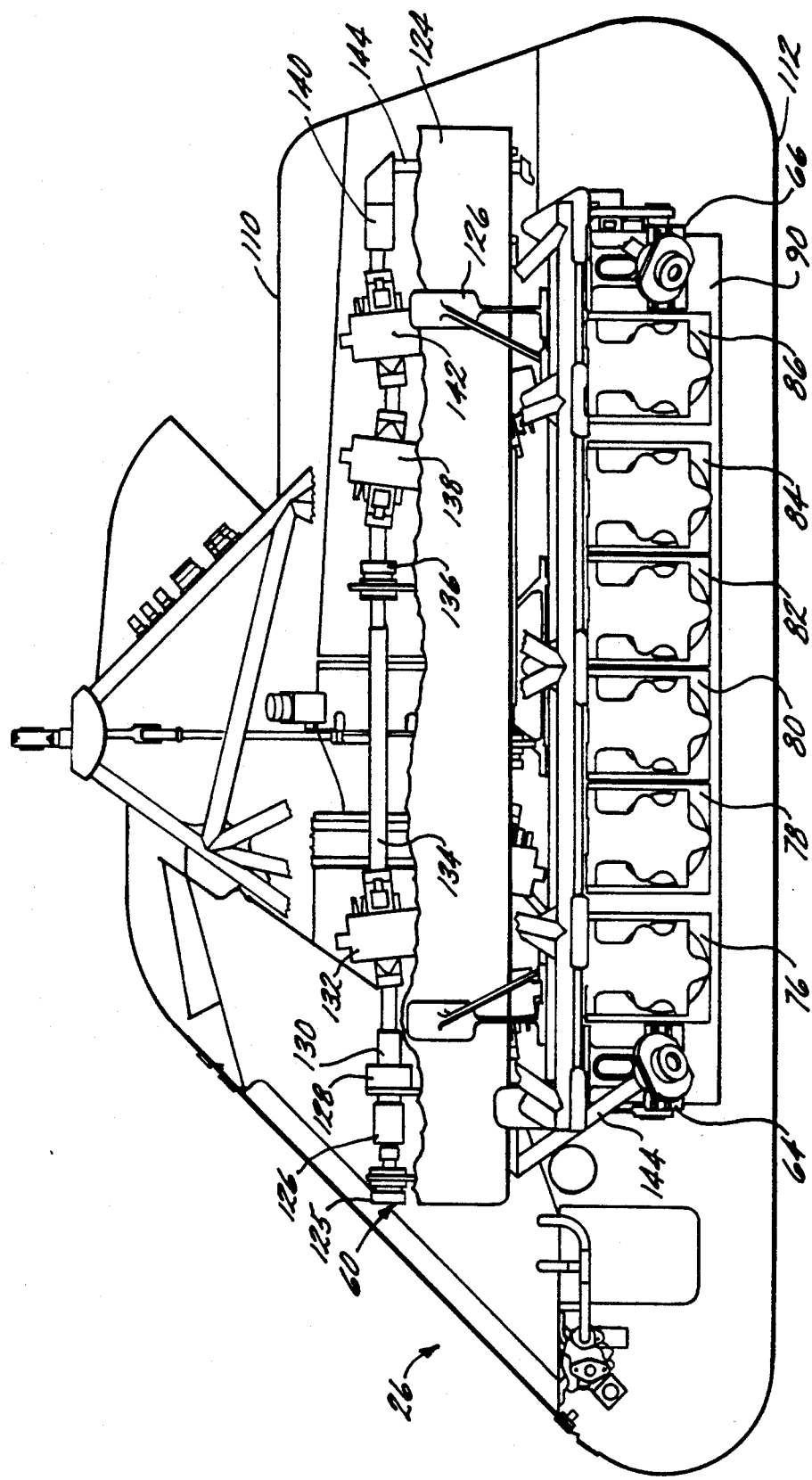
FIG. 6 is a side elevation view of the pod enclosure of FIG. 5.
Figure 7:
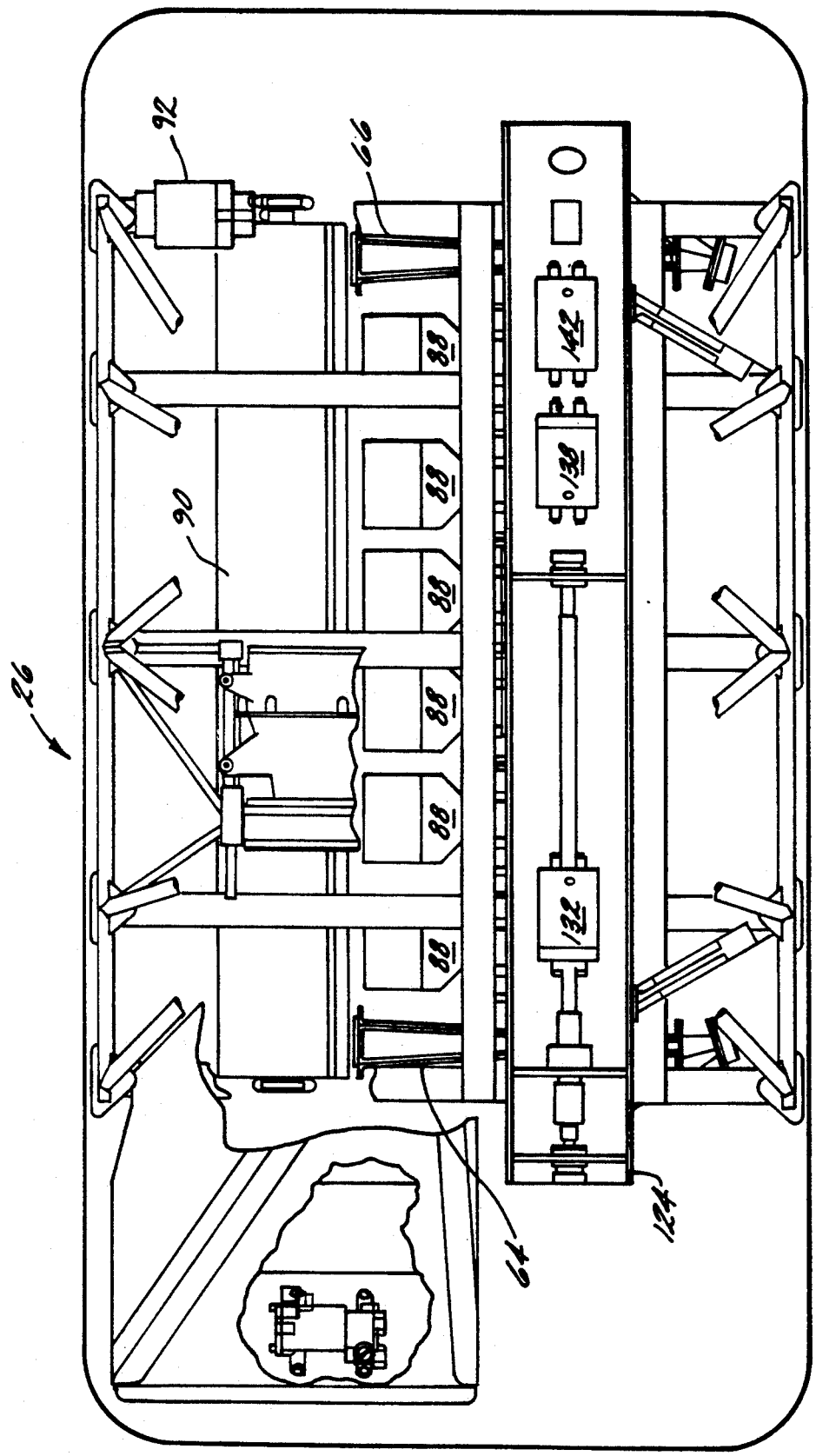
FIG. 7 is a top plan view of the pod enclosure of FIG. 5.

A system block diagram of this invention is shown in FIG. 4. Actual assembly drawings of the pod are shown in FIGS. 5-7 for a first embodiment of this invention; and FIGS. 14-16 for a second embodiment of this invention. Standard and known aircraft instruments 42 provide signals to computer 44 representing altitude, roll angle, pitch angle, compass heading angle, latitude and longitude (from a LORAN or Global Positioning System receiver), and ground speed (both forward and lateral components). Interface circuits 46 in computer 44 are used to measure the aircraft instrument data. Operator input data is provided by means such as a keyboard 48 or touch screen controller to computer 44 by means of an input interface 50. Delay generators 52 under software control are used to trigger the pulsed laser power supply 54 as described in detail in U.S. Ser. No. 420,247. Mission control panel 56 is used by the operator to activate the system. A pilot's master arm switch 58 is used as an interlock to enable or to disable the laser firing.

A pair of lasers 60 and 62 are driven by laser power supply 54 so that short (approximately 10 ns) pulses of visible light are generated. (It will be appreciated that the present invention may utilize only a single laser transmitter; however, multiple lasers are preferred for increased power as will be discussed in detail hereinafter). The small diameter laser beams are projected through novel beam projectors 64, 66 which convert the nonuniform intensity distribution of a typically round beam into a uniformly bright rectangular beam. Projectors 64, 66 form an important feature of this invention and are described in more detail with respect to FIGS. 8-13. A laser light monitor 68 provides a signal to the sensor monitor input circuits 70 of computer 44 to verify proper laser operation in terms of pulse frequency, pulse width and pulse energy. A cooler 72 is used to transfer heat from lasers 60, 62 to ambient air near pod 26. A temperature controller 74 maintains temperature of the cooling fluids to allow proper operation of the internal equipment.

The present invention also includes a plurality (preferably six) of aligned cameras 76, 78, 80, 82, 84 and 86 which comprise intensified charge coupled devices (ICCD). These ICCD's are preferably associated with electronic gating circuits (as described in U.S. patent application Ser. No. 365,133 filed Jun. 12, 1989, which is assigned to the assignee hereof and fully incorporated herein by reference) which allow exposure time of ten to hundreds of nanoseconds. Alternatively, the ICCD cameras may comprise the camera shown in FIG. 4 of U.S. Pat. No. 4,862,257. A lens assembly 88 is mounted on each of the multiple cameras 76-86 and comprise a multiple-element lens and a narrow spectral filter which is matched to the laser wavelength.

Pod 26 (shown in FIGS. 5-7 and 14-16) includes an upper section 110 having a generally pyramidical shape and a lower section 112 having a generally rectangular box shape. Upper section 110 is composed of a series of stainless steel or aluminum trusses with a center truss wall 114 defining two side-by-side compartments 116, 118. Compartment 116 houses cooler 72 which comprises a plurality of fluid filled heat transfer tubes 120 and a fan 122. Compartment 118 houses the laser transmitters 60, 62.

The components of the transmitters 60, 62 are securely fastened in proper alignment to a stiff and stable transmitter support structure 124 that is mounted in a quasi-static manner to pod 26. The transmitter support structure 124 is shaped like the letter H to promote attachment of each transmitter and to provide a structurally stiff configuration. In the preferred embodiment, the transmitter support structure is made using a suitable metal such as aluminum, steel, etc. or a high-modulus graphite-epoxy composite materials oriented so as to produce a laminate with a near zero coefficient of thermal expansion. In this manner, the transmitter 60, 62 can achieve a high degree of isolation from the potentially harmful misalignment effects of differential thermal expansions which could otherwise occur.

The transmitter-support structure assembly is protected from deformations, both thermal or mechanical, of the pod structure by the use of three V-shaped mounts 126 to connect the assembly to pod 26. The elements of mounts 126 are slender bars that effectively minimize the forces that are transmitted to the assembly in response to thermal and mechanical deformation of pod 26.

Each laser transmitter 60, 62 comprises the components defined in FIG. 2 of U.S. Pat. No. 4,862,257, including a rear mirror 125, Q-switch 126, polarizer 128, dust shield 130, oscillator 132, dust tube 134, front mirror 136, a first amplifier 138 and a harmonic generator 140. This laser system is augmented by the addition of a second amplifier 142 which increases the output power approximately 50 percent. The use of a second amplifier 142 in each transmitter is an important feature of this invention and has the advantage of providing increased power with good mechanical, volumetric and weight efficiency.

In accordance with another important feature of this invention, each of the cameras 76-86 and the lasers 60, 62 are optically boresighted to a common line of sight toward a scanning mirror 90. Scanning mirror 90 reflects the laser beams and the camera lines of sight from a nominally horizontal direction perpendicular to the aircraft heading down toward the nadir. The axis of motion of scanning mirror 90 is parallel to the aircraft heading, and allows a scanner drive motor 92 to rotate scanning mirror 90 in the roll direction, allowing the sensor to view to the left and to the right of the nadir. A scanner angle encoder (or equivalent such as a linear encoder) 94 is used to measure the mirror angle by providing feedback to a servo control loop implemented in computer 44. The multiple video outputs of cameras 76-86 are received by a video processor 96 in computer 44.

Two embodiments employing scanning mirrors are disclosed. The first and Preferred embodiment is shown in FIGS. 5-7 and utilizes a single, flat scanning mirror 90. The cameras are aligned and mounted perpendicular to the direction of flight of the airborne platform; and are adapted to receive discrete or overlapping images from the mirror. Each laser 60, 62 delivers its output (via light tube 144) to a beam projector 64, 66 which is also aligned with the cameras and located on either end of the camera lineup.

Figure 14:
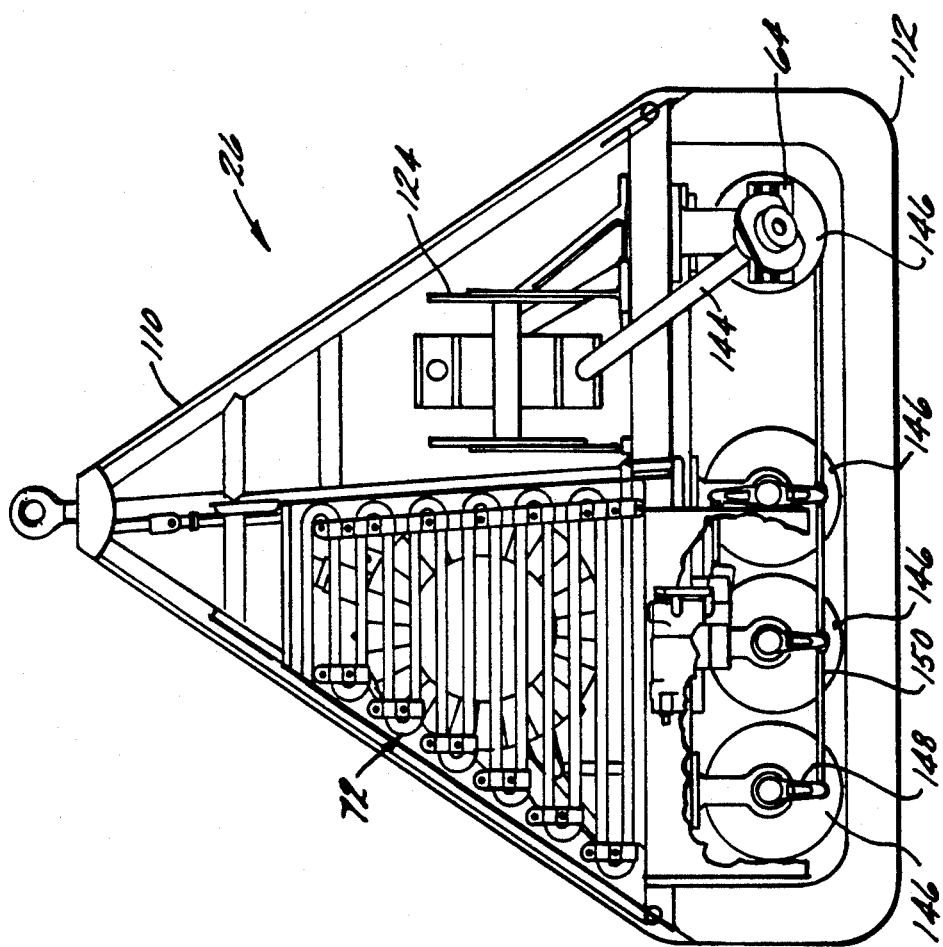
FIG. 14 is a front elevation view of the pod enclosure for a second embodiment of the imaging lidar system of FIG. 4.
Figure 15:
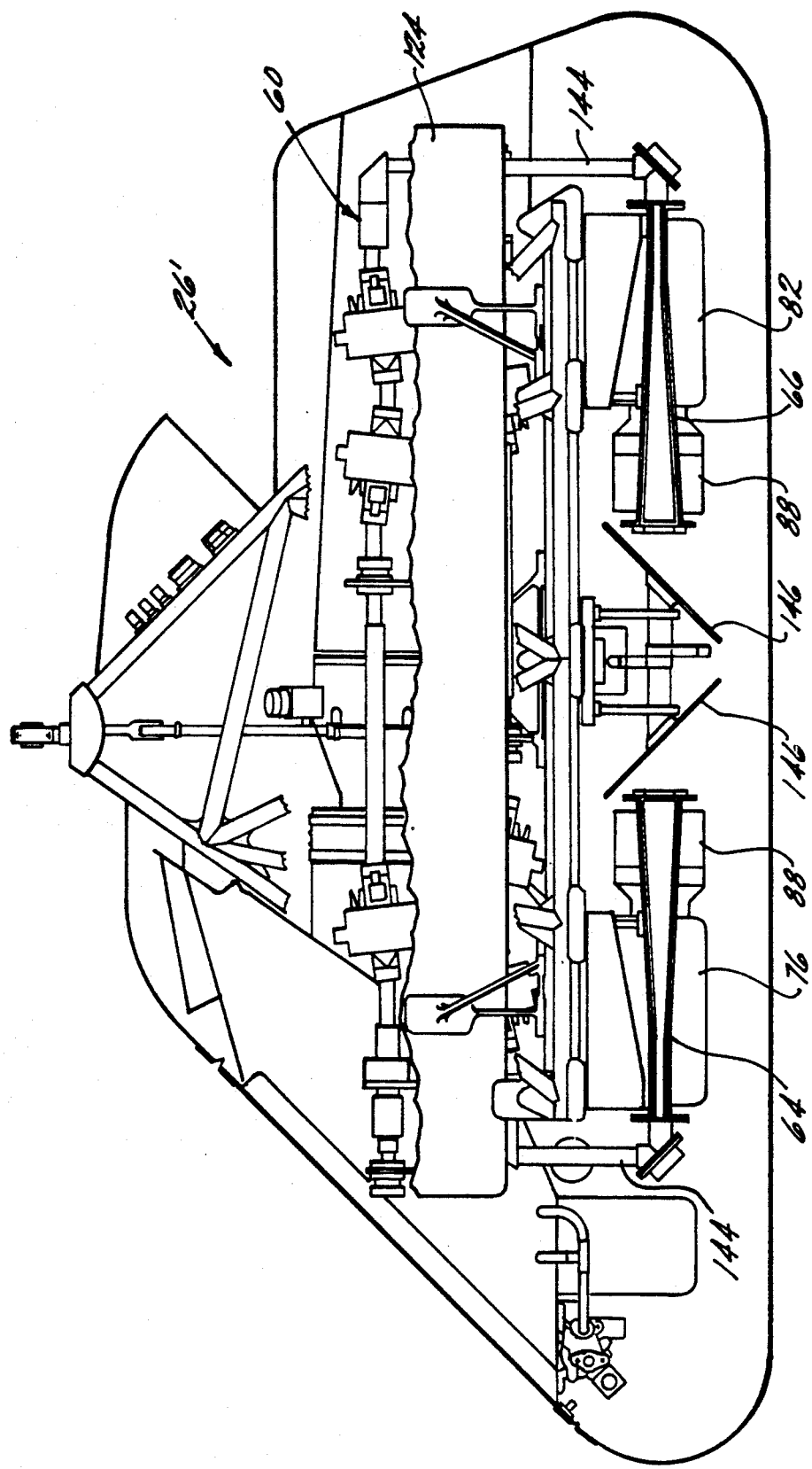
FIG. 15 is a side elevation view of the pod enclosure of FIG. 12.
Figure 16:
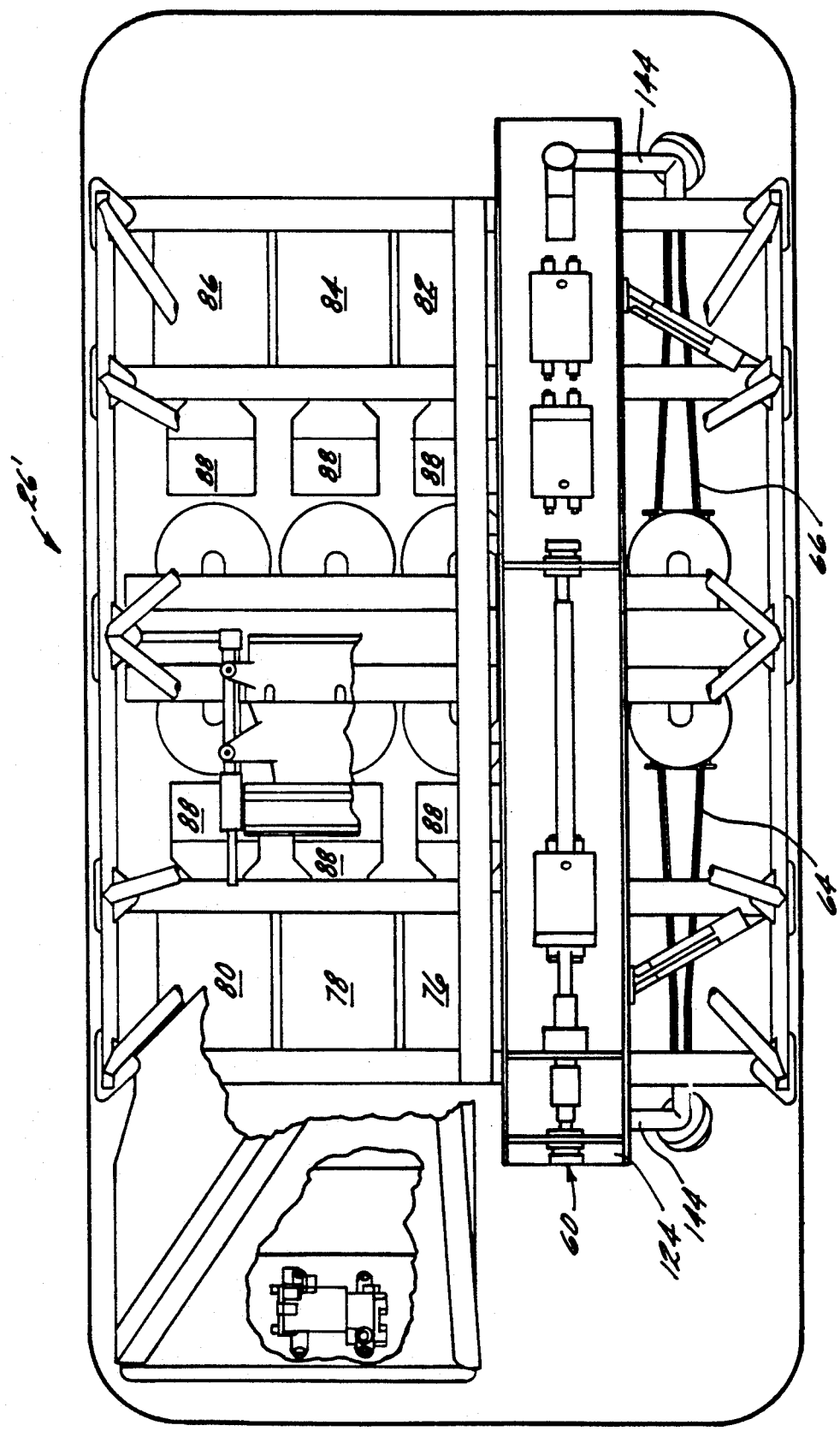
FIG. 16 is a top plan view of the pod enclosure of FIG. 12.

The second mirror configuration is depicted in FIGS. 14–16 and comprises a plurality (eight) of discrete circular scanning mirrors 146, one mirror being associated with each camera 76–80 and each laser 60, 62. A pair of the mirrors 146 are mounted on a link 148 (for a total of four links) with the links being attached to a shaft 150 for synchronized movement. The several cameras 76–80 are mounted in pod 26 such that the cameras are parallel to the direction of flight of the airborne platform. Thus, the FIGS. 14–16 configuration employs several small mirrors 146 linked so as to individually point and track in unison. This configuration has the advantage (relative to the FIGS. 5–7 embodiment) that each mirror is small and more amenable to low cost fabrication and dielectric coating to increase reflective efficiency. The disadvantages include the added complexity of the linkages and the alignment required.

Figure 8:
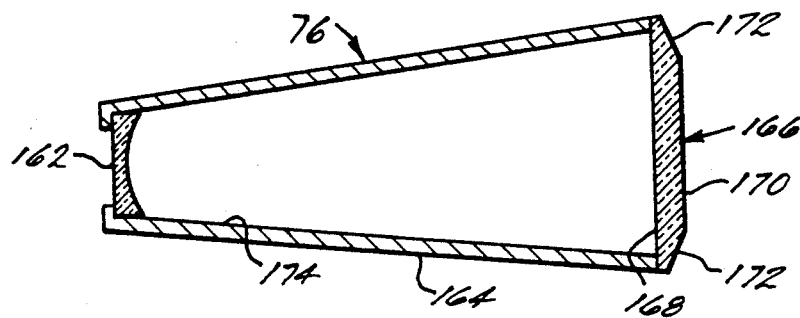
FIG. 8 is a cross-sectional elevation view of a radiation projecting device for use in the lidar system of this invention.

While prior lidar systems of the type described herein have utilized mirrors, these mirrors were fixed and were positioned only to direct the pulses of light emitted by the lasers down toward the water from the airborne platform. In distinct contrast, the present invention utilizes one or more moveable scanning mirrors for significantly enlarging the lateral range of search and detection. In addition, this scanning mirror is Positioned not only with respect to the laser emissions, as in prior systems, but also to receive the reflected light pulses (from the target) and direct these light pulses to the cameras. Referring first to FIG. 8, a preferred embodiment of the radiation projecting device of the present invention is shown generally at 64, 66 Device 64, 66 comprises a plano-concave lens 162, (or its equivalent such as a concave/concave lens), that over expands the entering beam relative to its final condition. Lens 162 is positioned on one end of an internally mirrored tube 164 of rectangular cross-section that expands generally linearly with length and which terminates at an exit optic 166. (It will be appreciated that the tube cross-section could be of some other desired polygonal shape so that a circular entrance beam will be transformed to that desired polygonal shape). Exit optic 166 has generally flat inner and outer panes 168, 170 respectively, with shaped edges 172 around the perimeter of outer pane 170 that refract rays that would otherwise be lost back into the desired field. Shaped edges 172 may be flat or curved bevel edges. In this preferred embodiment, the entrance optic 162 and the exit optic 166 also serve as seals to protect the mirrors 174 of tube 164 from contamination. Preferably, the interior of tube 164 is at a vacuum or has a moisture-free atmosphere provided by a suitable inert gas such as nitrogen. In an alternate configuration, exit optic 166 can be omitted, and the light that is lost by its omission can be made small by making the tube longer than the preferred configuration. Similarly, the entrance optic 162 may be omitted in the event that the entering beam has already been expanded.

Figure 9:
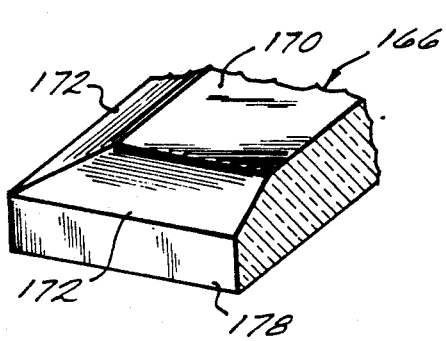
FIG. 9 is an enlarged perspective view of a corner portion of the radiation projecting device of FIG. 8.

FIG. 9 depicts a corner detail of exit optic element 166 wherein bottom pane 168 terminates at four transverse side edges 178; and a beveled or ramped edge 172 extends between each side edge 178 and upper pane 166. The FIG. 9 end optic configuration has the advantage of simplicity and low cost. However, the FIG. 9 corner detail can permit a pair of small triangles of radiation at each corner to escape projection into the desired rectangularly shaped beam.

Figure 10:
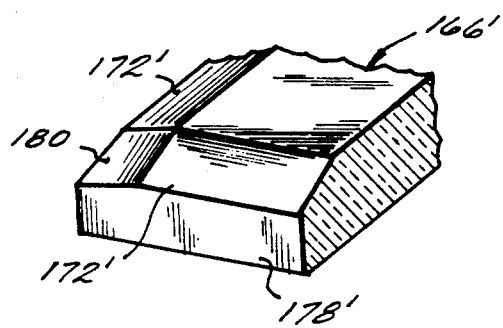
FIG. 10 is an enlarged perspective view, similar to FIG. 9, depicting an alternative embodiment of a corner portion.

FIG. 10 shows a preferred (relative to FIG. 9) corner embodiment that includes one or more facets 180 at each corner. The facets 180 redirect the radiation that would otherwise be lost at each corner into the desired rectangularly shaped beam.

Figure 11:
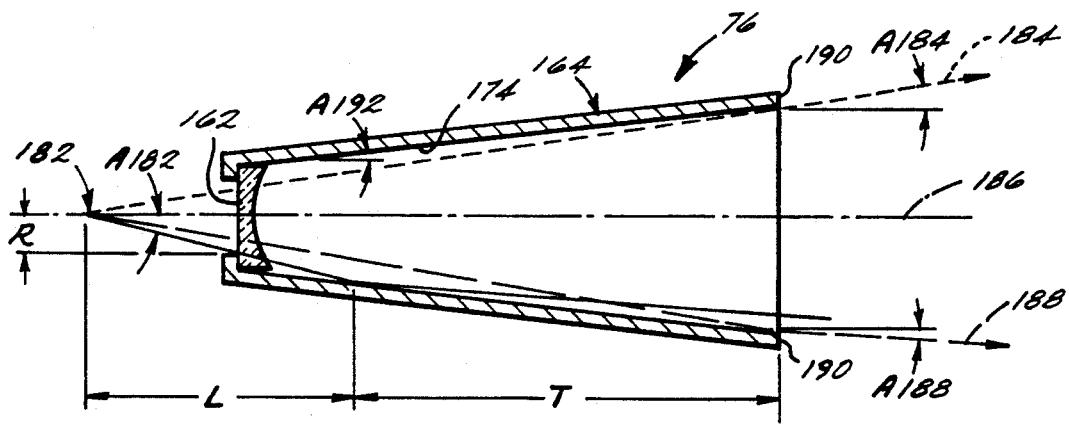
FIG. 11 is a diagrammatic view depicting the operation of the radiation projecting device of FIG. 8.
Figure 12:
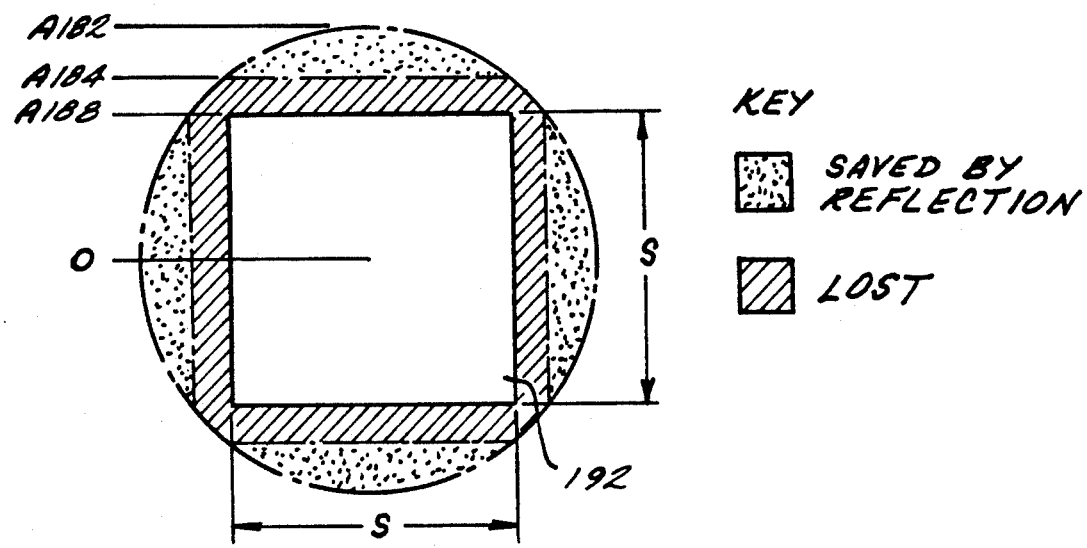
FIG. 12 is a cross-sectional diagram of a beam projected through the projecting device of FIG. 11.

The principal of operation for the radiation projection device of the present invention is described in the example of FIG. 11 which shows the cross-section of the device before the addition of an exit optic. Turning now to FIG. 11, consider parallel rays (such as from a laser) entering from the left of FIG. 11. The entrance optic 162 expands the rays producing a virtual origin 182 for the rays. Ray 184 just clears the rectangular tube 164 with no reflection and leaves device 160 at an angle A184 relative to the center axis 186. Ray 188 just strikes the end 190 of tube 164 and is reflected leaving the device at an angle A188 relative to the center axis. The taper angle A192 of the tube 164 and the maximum expansion angle A182 are selected so that all reflected rays leave the device at an angle less than A188. FIG. 12 shows approximately the form of the beam 192 of size SxS projected by the device of FIG. 11. If an exit optic 66 as shown in FIG. 8 is added to the device, the rays between angles A184 and A180 can be refracted into the desired projected beam 192. The user controls the position of such refracted rays in the projected beam by selection of the shape for regions 172 and 180 shown in FIGS. 8, 9 and 10. Such rays can be refracted principally into the edges of the beam thereby increasing the uniformity of a beam which otherwise would be dim at the edges, such as a laser beam of Gaussian distribution.

Referring again to FIG. 11, the following numerical example identifies the dimensions (L=4.767 inches, T=12.000 inches, and A192=2.792 degrees) for a projector device in accordance with this invention that receives a circular beam of parallel light of radius R=0.300 inches, expands the beam to a circular beam of an angle A182=3.800 degrees, and projects a square beam of angle A188=2.505 degrees. From the law of reflection, A184=3.079 degrees. It is noted that this combination of dimensions is for example only; and other combinations of dimensions may be found that may be more suitable for a specific application.

Figure 13:
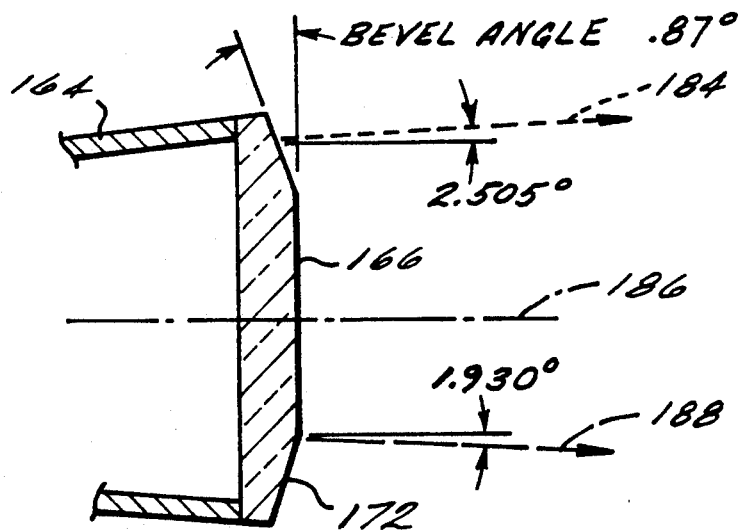
FIG. 13 is a cross-sectional elevation view through the end of the device of FIG. 8, depicting an operational example.

FIG. 13 shows an exit optic 166 constructed from a glass with an index of refraction, n=1.66, that redirects the rays between angles A188 and A184 into the edge regions of the desired square beam. It will be appreciated that when an exit optic is used, the final angle of the projected beam may be reduced to less than A188.

An automatic target detection and location data processing system is preferably implemented in computer 44 and assists in finding targets in the presence of noise and clutter returns, alerts the operator visually and orally, and generates a picture and location coordinates in three dimensions which are visible to the operator on a cathode ray tube display 98. (However, it will be appreciated that such automatic target detection systems are not required for the present invention to function, particularly when the noise conditions are favorable). Basic target data are stored in computer memory 100, recorded on digital data recorder 102, and relayed to a remote location by means of transmitter 104 and antenna 106.

Programmable delay generators 52 individually control timing of exposures of cameras 76–86. The time delay between laser pulse output transmission and camera shutter opening is the round trip propagation time through the air and through the water down to the desired depth. In still another important feature of this invention, the computer 44 adjusts the delay time for nonzero pitch and roll angles which result in slant path ranges which exceed the nominal air altitude and water depth. The computer also adjusts the time delay as the altitude changes based on input from the aircraft altimeter as described in U.S. Ser. No. 420,247. In addition, computer 44 adjusts the exposure on and off epochs so that the desired minimum and maximum depths of range gate volume are achieved. Based upon system simulations, a set of rules is developed and programmed into the computer to achieve optimum sensitivity. These rules determine the upper and lower edges of each of the multiple gates depending on the maximum desired search depth, the number of functional cameras and the optical properties of the backscattering medium (water).

Computer 44 also controls the electronic gain of intensifiers in cameras 76-86 depending on the average and peak video signal levels previously detected in each camera image generated from the last laser pulse. This assures maximum sensitivity while avoiding image saturation.

In accordance with the present invention, two sensor modes of operation are available—Search and Classification. In the Search mode, the scanner is used to obtain a large swath width so that a large area may be rapidly covered to locate potentially threatening targets In the Classification mode, the aircraft is flown back to the saved coordinates representing the target location. The scanner may be locked to the nadir viewing angle and once the target is again detected several of the cameras are set to the same range gate corresponding to the target depth determined by the computer. Images from these cameras can be averaged to improve SNR and enhance the operator's ability to classify the target. In addition, the aircraft can be flown at a lower altitude which produces two benefits. First, the SNR of the target picture is improved and second the spatial resolution of the sensor is also improved (there are more pixels across the target image). Both effects will assist in the classification and the identification of the target.

In addition to this mode of operation for the imaging lidar system of this invention, the present invention may be utilized in a different mode of operation to search for bioluminescent wakes from submarines and surface ships. In this alternative mode, the cameras are gated "on" nearly continuously and the lasers 60, 62 are disabled. In this embodiment, the sensor employs multiple low light television cameras 76-86 to detect self-illuminating targets, and for greater sensitivity, the spectral bandpass filters are also removed.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for detecting and imaging an object enveloped by a backscattering medium which is at least partially transmitting to light comprising:
   generating means for selectively generating short pulses of light;
   mirror means in optical communication with said generating means, said mirror means receiving said pulses of light from said generating means and projecting said short pulses of light toward the backscattering medium and at an object enveloped by the medium, said mirror means being selectively oriented to also receive said pulses of light reflected back from said object after a time delay corresponding to the round-trip propagation time of said light pulses to and from said object;
   detecting means in optical communication with said scanning mirror means, said detecting means detecting said reflected pulses of light received by said mirror means; and
   converting means for converting said detected pulses of light to a video image of said object.

2. The apparatus of claim 1 wherein:
   said generating means and said detecting means are optically oriented to a common line of sight along said mirror means.

3. The apparatus of claim 1 wherein said apparatus is mounted on an airborne platform with said airborne platform having a longitudinal axis and wherein:
   said mirror means is oriented on said airborne platform so that said generated pulses of light are projected, and said reflected pulses of light are detected from a nominally horizontal direction perpendicular to the airborne platform heading direction.

4. The apparatus of claim 3 including:
   drive means for selectively rotating said mirror means around an axis parallel to the airborne platform longitudinal axis wherein images are viewed laterally of said airborne platform longitudinal axis.

5. The apparatus of claim 4 including:
   angle measuring means for measuring the angle of said mirror means.

6. The apparatus of claim 4 wherein:
   said drive means rotates said mirror means in steps configured to produce overlapping images.

7. The apparatus of claim 1 wherein:
   said mirror means comprises a single mirror.

8. The apparatus of claim 7 wherein:
   said mirror means comprises a flat mirror.

9. The apparatus of claim 1 wherein:
   said mirror means comprises a plurality of synchronized discrete movable mirrors, one each of said mirrors being associated with said detector means and said generator means.

10. The apparatus of claim 3 wherein:
    said detector means comprises a plurality of cameras mounted perpendicularly with respect to said longitudinal axis.

11. The apparatus of claim 3 wherein:
    said detector means comprises a plurality of cameras mounted parallel with respect to said longitudinal axis.

12. The apparatus of claim 1 wherein:
    said mirror means comprises movable scanning mirror means.

13. The apparatus of claim 1 wherein said generating means comprises at least one laser.

14. The apparatus of claim 13 wherein said generating means comprises a plurality of lasers.

15. The apparatus of claim 1 wherein said detecting means comprises at least one camera means.

16. The apparatus of claim 1 wherein said detecting means comprises a plurality of camera means.

17. The apparatus of claim 16 wherein said detecting means comprises six camera means.

18. The apparatus of claim 13 wherein said detecting means comprises at least one camera means.

19. The apparatus of claim 18 including:

laser projection means for transforming said pulses of light into a rectangular field of view; and means in said camera means for configuring said camera means field of view as rectangular.

20. The apparatus of claim 1 wherein said light pulse generating means, mirror means and detecting means are mounted on a pod and further including:

attachment means for attaching said pod to an airborne platform, said attachment means including means for angularly orienting the pod independently of the airborne platform orientation.

21. The apparatus of claim 20 wherein said attachment means includes:

three linear actuators for adjusting the orientation of said pod with respect to the angular attitude of said airborne platform.

22. The apparatus of claim 1 including:

switching means in said airborne platform for enabling or disabling operation of said light pulse generating means.

23. An apparatus for detecting and imaging an object enveloped by a backscattering medium which is at least partially transmitting to light comprising:

generating means for selectively generating short pulses of light;

projecting means for projecting said pulses of light toward the backscattering medium and at an object enveloped by the medium;

movable scanning mirror means for receiving said pulses of light reflected back from said object after a time delay corresponding to the roundtrip propagation time of said light pulses to and from said object;

detecting means for detecting said reflected pulses of light received by said scanning mirror; and converting means for converting said detected pulses of light to a video image of said object.

24. An apparatus for detecting and imaging from an airborne platform an object enveloped by a backscattering medium which is at least partially transmitting to light, the airborne platform having instrumentation for measuring platform angular attitude, comprising:

pulsed light source generating means generating short pulses of light from the airborne platform;

projecting means for projecting said short pulses of light toward the backscattering medium and at an object enveloped by the backscattering medium;

computer means for monitoring the angular attitude of the airborne platform in response to input from the instrumentation, said angular attitude input being generated independently of said pulsed light source generating means;

camera means for detecting said pulses of light reflected back from said object, said camera means being gated open by input from delay generator means, said camera means being gated open after a selected time delay corresponding to the roundtrip propagation time of said light pulses to and from said object;

said computer means calculating said selected time delay based on input data which includes the angular attitude input from said instrumentation, said computer means inputting said selected time delay to said delay generator means; and converting means for converting said detected pulses of light to a video image of said object.

25. The apparatus of claim 24 wherein said airborne platform has instrumentation for measuring altitude platform and wherein:

said computer means monitors the altitude of the airborne platform in response to altitude input from the instrumentation and wherein said computer means calculates said selected time delay based on input data which includes the altitude input from said instrumentation.

26. The apparatus of claim 24 wherein said angular attitude input includes pitch angle and roll angle.

27. An imaging lidar apparatus for detecting and imaging an object enveloped by a backscattering medium which is at least partially transmitting to light, the imaging lidar apparatus being mounted on an airborne platform and including light pulse generating means, reflected light pulse detection means and computer control means, and further including:

a pod for housing said light pulse generating means and said light pulse detection means; and attachment means for attaching the pod to the airborne platform, said attachment means including means for angularly orienting the pod independently of the airborne platform orientation.

28. The apparatus of claim 27 wherein said attachment means includes:

three linear actuators for adjusting the orientation of said pod with respect to the attitude of said airborne platform.

29. An imaging lidar apparatus for detecting and imaging an object enveloped by a backscattering medium which is at least partially transmitting to light, the imaging lidar apparatus being mounted on an airborne platform and including light pulse generating means, reflected light pulse detection means and computer control means, and further including:

a pod for housing said light pulse generating means and said light pulse detection means, said pod comprising a plurality of inerconnected trusses arranged in a generally pyramidical shaped section and having a plurality of internal chambers for said light pulse generating means.

30. The apparatus of claim 29 including:

a support beam with an "H" shape cross-section in one of said chambers and wherein said light pulse generating means is supported on said support beam.

31. The apparatus of claim 30 wherein:

said support beam is comprised of a polymer impregnated fiber composite or metal.

32. The apparatus of claim 30 including"

at least three "V" shaped mounts connecting said support beam to said pod.

33. The apparatus of claim 29 wherein:

said pod includes a lower section rectangularly attached to said pyramidical shaped section, said lower section including said light pulse detection means.

34. The apparatus of claim 33 wherein:

said lower section further includes scanning mirror means in optical alignment with said light pulse detection means.

35. The apparatus of claim 29 including:

cooling means in one of said chambers for transferring heat away from the other of said chambers.

36. An apparatus for detecting and imaging an object at least partially enveloped by a backscattering medium which is at least partially transmitting to light comprising:
- light pulse generating means for selectively generating short pulses of light;
- light projection means for receiving said pulses of light from said light pulse generating means and transforming the cross-section of said light pulse from a first shape to a preselected second shape;
- projecting means for projecting said short pulses of light toward the backscattering medium and at an object enveloped by the medium;
- camera means for detecting said pulses of light reflected back from said object after a time delay corresponding to the round-trip propagation time of said light pulses to and from said object; and
- converting means for converting said detected pulses of light to a video image of said object.

37. The apparatus of claim 36 wherein:
said preselected second shape comprises a polygonal shape.

38. The apparatus of claim 37 wherein said light projection means comprises:
- tube means having a plurality of sides and having a polygonal cross-section with respect to the length of said tube means, said polygonal cross-section increasing between a first end of said tube means and a second end of said tube means at a preselected angle wherein a beam of light having said first shape entering said first end is substantially transformed to a beam of light having said polygonal cross-section exiting said second end; and
- mirror means on an interior surface of said tube means.

39. The apparatus of claim 38 including:
entrance optics means in said first end of said tube means, said entrance optic means expanding a beam of light entering said tube means.

40. The apparatus of claim 39 wherein:
said entrance optics means comprises a plano-concave or concave-concave lens.

41. The apparatus of claim 38 including:
exit optic means in said second end of said tube means, said exit optics means including refractive means for refracting light rays back towards a preselected field of view corresponding to said polygonal cross-section.

42. The device of claim 41 wherein:
said refractive means comprises beveled edges extending from each side of said polygonal cross-section.

43. The apparatus of claim 42 wherein adjoining pairs of said beveled edges terminate at a corner and including:
a facet formed in said corner.

44. The apparatus of claim 38 wherein said tube means is sealed defining an internal cavity and including:
a moisture free environment in said cavity.

45. The apparatus of claim 38 wherein:
said polygonal cross-section comprises a rectangle or square.

46. The apparatus of claim 36 including:
means in said camera means for configuring said camera means field of view as said preselected second shape.

47. The apparatus of claim 46 wherein:
said preselected second shape has a polygonal cross-section.

48. The apparatus of claim 47 wherein:
said polygonal cross-section comprises a rectangle or square.

49. An apparatus for detecting and imaging an object enveloped by a backscattering medium which is at least partially transmitting to light comprising:
- at least one laser generating means for selectively generating short pulses of light toward the backscattering medium and at an object enveloped by the medium;
- detecting means for detecting said pulses of light reflected back from said object after a time delay corresponding to the round-trip propagation time of said light pulses to and from said object; and
- converting means for converting said detected pulses of light to a video image of said object; and
- wherein said laser generating means further includes;
- a first amplifier for amplifying the strength of said generated pulses of light; and
- a second amplifier spaced from said first amplifier and in optical communication with said first amplifier, said second amplifier further increasing the strength of said generated pulses of light.

50. The apparatus of claim 49 wherein said laser generating means further comprises:
at least two discrete lasers having means for simultaneous triggering of light pulses.

51. An apparatus for detecting and imaging an object enveloped by a backscattering medium which is at least partially transmitting to light comprising:
- at least two laser generating means for selectively simultaneously generating short pulses of light toward the backscattering medium and at an object enveloped by the medium;
- detecting means for detecting said pulses of light reflected back from said object after a time delay corresponding to the round-trip propagation time of said light pulses to and from said object; and
- converting means for converting said detected pulses of light to a video image of said object.

52. A method of detecting or imaging an object using an imaging lidar system having a plurality of cameras for viewing range gates of varying depths and being mounted on an airborne platform comprising the steps of:
(1) directing the imaging lidar system to search over a large swath width to locate objects of interest;
(2) storing the coordinates of any located objects of interest detected by the imaging lidar system;
(3) returning the imaging lidar system to selected of said stored coordinates and again detecting an object of interest;
(4) directing at least two of said cameras to the sa range gate corresponding to the depth of the object of interest to enhance an image of the object of interest.

53. The method of claim 52 including the step for:
averaging the images of said at least two cameras to enhance the image of the object of interest.

54. The method of claim 52 including the step of:
positioning said airborne platform at a lower altitude in Step 3 relative to the altitude in Step 1.

* * * * *

UNITED STATES PATENT AND TRADEMARK OFFICE
CERTIFICATE OF CORRECTION

PATENT NO.    : 5,231,401
DATED         : July 27, 1993
INVENTOR(S)   : Charles H. Kaman et al.

It is certified that error appears in the above-identified patent and that said Letters Patent is hereby corrected as shown below:

Column 1,
Line 27, after "commercial", delete "Purposes" and insert therefor -- purposes --
Lines 57-58, after "vision.", begin a new paragraph Column 2,
Line 12, after "medium.", begin a new paragraph Column 3,
Line 60, after "FIG.", delete "12" and insert therefor -- 14 --
Line 62, after "FIG.", delete "12" and insert therefor -- 14 --

Column 4,
Line 64, after "heading)", insert -- . -- (period)

Column 6,
Line 60, after "and", delete "Preferred" and insert therefor -- preferred --

Column 7,
Line 25, after "is", delete "Positioned" and insert therefor -- positioned --
Line 29, after "cameras.", insert a new paragraph
Line 31, after "66" (first occurrence), insert -- . -- (period)

Column 8,
Line 21, after "optic", delete "66" and insert therefor -- 166 --

UNITED STATES PATENT AND TRADEMARK OFFICE
CERTIFICATE OF CORRECTION

PATENT NO.    : 5,231,401
DATED         : July 27, 1993
INVENTOR(S)   : Charles H. Kaman et al.

It is certified that error appears in the above-identified patent and that said Letters Patent is hereby corrected as shown below:

<u>Column 12,</u>
Line 40, after "of", delete "inerconnected" and insert therefor -- interconnected --
Line 52, after "30", delete "including" and insert therefor -- including: --

<u>Column 14,</u>
Line 56, after "the", delete "sa" and insert therefor -- same --

Signed and Sealed this

Twenty-seventh Day of August, 2002

Attest:

Attesting Officer

JAMES E. ROGAN
Director of the United States Patent and Trademark Office